Feb. 7, 1928.
W. WELSCH
1,658,662
ALTERNATING CURRENT COMMUTATOR MOTOR REGULATING APPARATUS
Filed Sept. 25, 1926    2 Sheets-Sheet 1
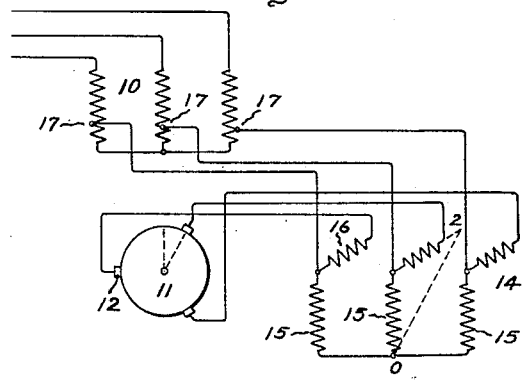
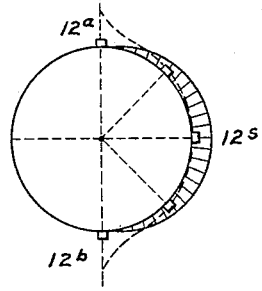
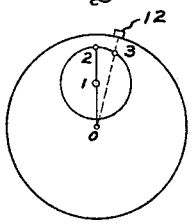
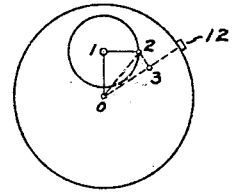
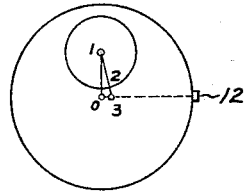
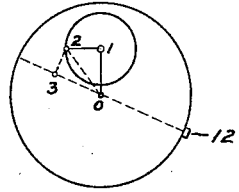
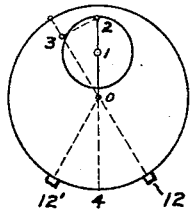
Inventor
Wilhelm Welsch,
by
His Attorney.

Feb. 7, 1928.
W. WELSCH
1,658,662
ALTERNATING CURRENT COMMUTATOR MOTOR REGULATING APPARATUS
Filed Sept. 25, 1926 2 Sheets-Sheet 2
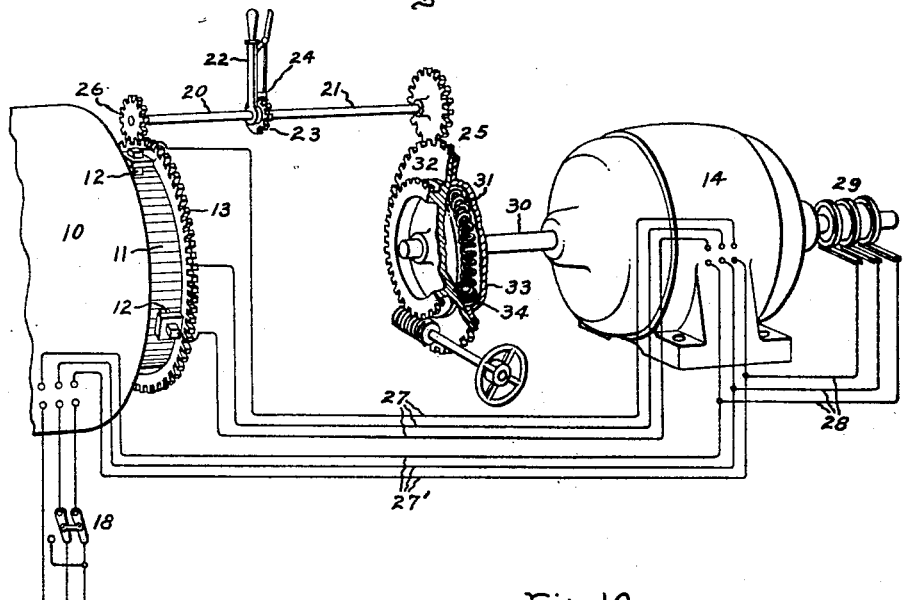
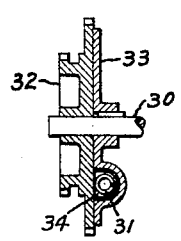
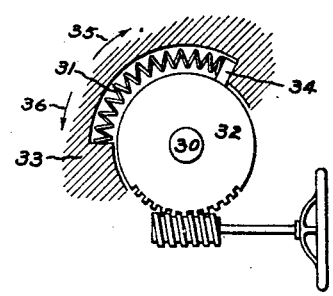
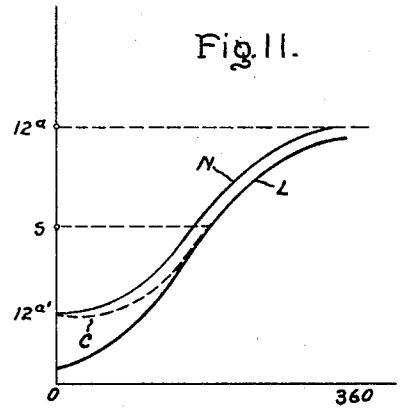
Inventor
Wilhelm Welsch
by
His Attorney.

Patented Feb. 7, 1928.

1,658,662

UNITED STATES PATENT OFFICE.

WILHELM WELSCH, OF NIEDERSCHONHAUSEN, GERMANY, ASSIGNOR TO GENERAL ELECTRIC COMPANY, A CORPORATION OF NEW YORK.

ALTERNATING-CURRENT-COMMUTATOR-MOTOR REGULATING APPARATUS.

Application filed September 25, 1926, Serial No. 137,801, and in Germany October 5, 1925.

My invention relates to alternating current commutator motor regulating apparatus wherein such a motor has its secondary commutator winding provided with adjustable brushes which are supplied with regulating voltages through an induction voltage regulator. In particular my invention relates to such a combination wherein the adjustment of the brushes and the adjustment of the voltage regulator is effected simultaneously to provide speed and power factor regulation and in which the same adjusting apparatus may be used for both directions of rotation of the commutator motor. Another feature of my invention is the provision with such apparatus of load responsive speed compensating means.

The features of my invention which are believed to be new and patentable will be pointed out in the claims appended hereto. For a better understanding of the invention, reference is made in the following description to the accompanying drawing in which Fig. 1 represents a preferred arrangement of the electrical connections for the apparatus of my invention, the physical embodiment of which is represented in Fig. 8; Fig. 2 illustrates the character of power factor compensation obtained by brush displacement and by means of the voltage regulator for various positions of adjustment; Figs. 3 to 7 inclusive are vector diagrams representing the voltage vectors produced by the voltage regulator and that produced by brush adjustment for various positions of the regulating apparatus; Fig. 9 is a cross section of the regulating device shown in Fig. 8; Fig. 10 is a more or less diagrammatic representation of this regulating device illustrating the load responsive speed compensating feature between the voltage regulator and the brush yoke of the commutator motor; and Fig. 11 shows brush displacement speed curves for different load conditions which will be referred to hereinafter.

The type of motor with which the invention has been illustrated herein is a polyphase motor having its secondary rotor winding connected to a commutator.

In Figs. 1 and 8, 10 represents the primary stator member, and 11 the rotary secondary commutated member. Bearing on the commutator is a single set of brushes 12 arranged in polyphase relation, i. e., three brushes per pair of poles for a three-phase rotor. These brushes are mounted on an adjustable brush yoke 13 as shown in Fig. 8. 14 represents an induction voltage regulator or rotary transformer, as it is sometimes called, having primary windings 15 and relatively adjustable secondary windings 16. The primary winding which is here shown connected in $y$ is preferably placed on the rotary part of this regulator in order to eliminate the necessity of two sets of slip rings. The primary winding is supplied at constant voltage from the same source as the primary 10 of the motor and may be connected at appropriate voltage taps 17 of the primary winding of the motor, as represented in Fig. 1. The rotary transformer is connected as an auto-transformer to the brushes 12 of the motor so that by relatively rotating the primary and secondary windings of the induction regulator the voltage supplied therefrom to the commutated winding may be varied causing the motor to run below or above synchronous speed. The magnitude and phase angle of the voltage supplied to the brushes from the regulator may be indicated by the length and direction of the dotted line 0—2 of Fig. 1 which is made of a constant voltage supplied by the winding 15 and a relatively variable angle constant magnitude voltage supplied by the winding 16. The sum 0—2 of these two voltages is impressed upon the commutator brushes.

It is evident that as the induction regulator is adjusted to vary the voltage, a certain amount of phase compensation may be provided thereby in certain positions. It is also possible to obtain phase compensation by displacement of the brushes, that is by a lag of the brushes relative to the direction of rotation for super-synchronous operation and a lead of the brushes for sub-synchronous operation. Such compensation is desirable and it may be obtained at all speeds including synchronism by a combination of the two methods just mentioned. This simultaneous adjustment of the speed and power factor compensation is obtained by providing a mechanical coupling between the voltage regulator and the brush yoke of the desired gear ratio and by properly positioning the brushes with respect to the position of the voltage regulator as well as proper size relation between voltages 0—1 and 1—2.

An example of the relative compensation which may be supplied by voltage regulation and by brush displacement is illustrated in Fig. 2 where 12$^a$ represents the position of a brush for super-synchronous operation, 12$^s$ for synchronous operation, and 12$^b$ for sub-synchronous operation. The cross-hatched sector outside the circle represents the compensation obtained from the voltage regulator, it being the greatest in the zone of synchronism. The area between the dotted line outside the circle represents the compensation obtained by brush displacement and it is a maximum at the extreme positions.

If it is desired that the apparatus be designed to enable the motor to operate in different directions of rotation, it will be a necessary addition to reversing the rotating field of the motor to effect also a reversing of the compensating voltages. The phase compensation over the speed range exemplified in Fig. 2 for both directions of rotation may be accomplished without introducing complications in the regulating apparatus in the manner now to be explained.

In Figs. 3 to 7 inclusive, the large circle may be considered as the commutator of the motor which is here assumed to be a two-pole motor, and 12 one of the commutator brushes.

In the smaller circles 0—1 indicates the fixed voltage vector of the voltage regulator supplied by winding 15; 1—2 the angularly variable voltage vector supplied by winding 16, and 0—2 the resultant voltage vector of that phase of the regulator connected to the brush 12 under consideration. 0—3 is the speed or working component of the regulator voltage 0—2, and 2—3 the compensating component. The mechanical transmission between the voltage regulator and the brush yoke of the motor and the relative positions of the voltage regulator and brush yoke will be such as to produce the results indicated.

Fig. 3 corresponds to the super-synchronous operation in which the compensation is obtained exclusively by the lagging shift of the brushes. The two voltages of the regulator are in phase. In the case of about one-half super-synchronous operation, as shown in Fig. 4, the regulator has been adjusted 90 electrical degrees and the brushes adjusted somewhat less than half of this. Here the compensation is obtained partially by the voltage difference between the vectors 0—1 and 0—2 and partially by a shifting of the brushes from the 45° position. It is seen that if vectors 0—1 and 0—2 were equal, their resultant would be on the 45° line and compensation would be produced exclusively by the shift of the brush from such 45° line.

In Fig. 5, which corresponds to synchronous operation, the induced voltage 0—3 is zero but these points have been separated slightly for the sake of clearness. The compensation represented by line 2—3 is obtained exclusively by the difference in the voltage vectors of the regulator which are now 180° out of phase. Figs. 6 and 7 correspond to one-half sub-synchronous and full sub-synchronous operations respectively. For these positions it is noted that the direction of the working component and the relative direction of the compensating component are reversed from what they were for super-synchronous operation, which is as desired. If it is desired that power factor correction below synchronism shall be greater than above synchronism, the angle 12—0—4, Fig. 7, may be made greater than the angle 12—0—2, Fig. 3.

While the induction regulator has been shifted 360 degrees, the brush yoke has been shifted less than 180° so that the gear ratio between the regulator and brush yoke of the motor should be as 360 is to the angle of brush shift, or slightly greater than 2:1, and furthermore, the voltage 0—1 should be greater than the voltage 1—2 to the extent 2—3 in Fig. 5 corresponding to the amount of compensation desired at synchronous speed.

Now, in order to reverse the direction of rotation of the motor and use the same regulating apparatus for the opposite direction of rotation, it is only necessary to reverse the phase rotation of the motor as by means of the switch 18, Fig. 8, and to shift the brushes 12 independently of the regulator to the position corresponding to 12′, Fig. 7. This may be done for example by the connection indicated in Fig. 8. Here the shafts 20 and 21 are separate sections. Part 20 has a hand lever 22 secured thereto and part 21 has a notched wheel 23 secured thereto. The hand lever carries a latch 24 which normally meshes with a notch in wheel 23 to complete the driving connection between the adjusting mechanism of the regulator indicated at 25 and that of the brush yoke indicated at 26. When it is desired to shift the brushes independently of the regulator, the parts 20 and 21 are unlocked and the brushes shifted the desired amount and direction after which the parts are again locked together for simultaneous operation. Thus, in reversing, the voltage regulator is left in the initial position corresponding to that shown in Fig. 7 while the brushes are shifted through the angle 12—0—12′ to give them the same relative angle of lead that they had before the direction of rotation of the motor was reversed. Now, to increase the speed in the new direction of rotation, it is only necessary to simultaneously move the brush yoke and regulator in the same direction and in the same ratio as before. To increase the speed to the maximum super-synchronous range, the brushes are shifted in the clockwise direction through an angle somewhat less than 180 degrees while the voltage regulator is adjusted through another 360 degrees in the same direction as before. For this new direction of rotation, vector diagrams corresponding to those of Figs. 3 to 7 inclusive, but reversed with respect to the vertical axis, will apply. This arrangement thus provides for the convenient speed and power factor regulation in either direction of rotation over the complete range of speeds above and below synchronism. If it is desired to limit the compensation to that produced by the voltage regulator alone, the brushes should be moved through 180° while the regulator is moved through 360°, in which case no relative adjustment of the two parts of the adjusting mechanism will be necessary when reversing the direction of rotation of the motor.

The adjustable coupling between the two parts of the regulating mechanism allows either the brushes, or the regulator to be adjusted alone, or in any desired relation to each other so as to take care of special operating conditions. As shown in Fig. 8 the voltage regulator 14 may be built with stator and rotor mechanically similar to that of an ordinary dynamo electric machine. The winding 16, Fig. 1, will preferably be placed on the stator. The brushes 12 of the motor are connected to one end of this winding by leads 27. The other end of this winding is connected to suitable voltage taps on the primary winding of the motor by leads 27' and to the winding 15 (Fig. 1), which is on the rotor of the regulator, by leads 28 and slip rings 29. The rotor shaft 30 is secured to the adjusting mechanism 25 either directly or through a load responsive coupling represented at 31. This feature of the invention will now be explained in connection with Figs. 8, 9, 10 and 11.

Particularly in the sub-synchronous speed range of operation an increase in load will ordinarily cause the speed to drop undesirably without any adjustment of the regulating mechanism. To compensate for this, advantage is taken of the increase in torque between the two parts of the voltage regulator due to increase in its load current, to cause an additional adjustment between regulator and brush shifting mechanism which is automatically proportional to load. As shown in Figs. 8 and 9 there is a spring 31 between the shaft 30 of the regulator and the adjusting wheel 32. This spring is contained in a sector shaped casing 33 keyed to the shaft 30 and is compressed between an abutment in this casing and an abutment 34 projecting therein from the adjusting wheel 32 in the manner more or less diagrammatically represented in Fig. 10 for the sake of clearness.

The adjusting wheel 32 is loose on shaft 30 but is connected to this shaft through the spring coupling just described. The torque of the regulator is proportional to current component which is in phase with the magnetic flux of the regulator. With the present connection the regulator has in the maximum sub-synchronous speed range a maximum value of torque in the direction represented by the arrow 35, Fig. 10. At synchronous speed this torque is zero and at super-synchronous speed it is reversed as represented by the arrow 36. Moreover, this torque is proportional to the load.

Now is it seen that when the regulator tends to move in the direction of arrow 35 with respect to the wheel 32 the spring 31 will be compressed to an extent dependent upon the load and the voltage produced by the regulator will be altered, thereby allowing more current to flow in the secondary circuit of the motor which tends to prevent the speed from falling as the load is increased in the sub-synchronous operating range. At light loads the torque of the regulator will not compress the spring to any appreciable extent. This arrangement in no way interferes with the simultaneous adjusting mechanism, nor will it produce an undesirable displacement at synchronous or super-synchronous speeds since at synchronous speed the regulator torque is zero and at super-synchronous speeds the regulator torque is in such direction to maintain the abutment 34 against the right hand end of the spring slot so that for these speeds the driving connection is fixed, but for sub-synchronous speeds this driving connection is flexible and produces compensation tending to prevent drop in speed with increase in load.

The flexible adjustment, which is responsive both to load and to the sub-synchronous speed adjustment below synchronism, produces the improvement represented in Fig. 11. Here the abscissa line 0—360 represents the displacement of the voltage regulator and the ordinates 0—S—12$^a$ represent the displacement of the brushes with corresponding speeds, 12$^{a'}$, S and 12$^a$ being brush positions corresponding to sub-synchronous, synchronous and super-synchronous speeds, respectively.

The curve N represents the nature of the speed variation for corresponding various positions of the regulating apparatus at no load on the motor, and L the corresponding full load speed curve when no compensation for the drop in speed with load is applied. When automatic compensation is applied in accordance with my invention, the curve L is modified to the extent shown in dotted lines at C such that there is no drop in speed at all between no load and full load for the full sub-synchronous speed adjustment.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. In combination, an alternating current commutator motor provided with adjustable brushes, an induction regulator connected to supply regulating voltages to said brushes, and means for simultaneously adjusting said regulator and brushes to vary the speed of said motor, the position of the brushes with respect to the regulator and the adjusting ratio between them being such as to provide power factor compensation by brush displacement at speeds removed from synchronism and by the voltage regulator in the synchronous operating range.

2. In combination, an alternating current commutator motor provided with adjustable brushes, an induction regulator connected to supply regulating voltages to said brushes, and means for simultaneously adjusting said regulator and brushes to vary the speed of said motor in a manner to provide power factor compensation, and means whereby said brushes may be adjusted independently of the adjustment of said regulator.

3. In combination, a reversible alternating current commutator motor provided with adjustable brushes, an induction regulator connected to supply regulating voltages to said brushes, and means for simultanously adjusting said regulator and brushes to vary the speed of said motor in a manner to provide power factor compensation in either direction of rotation, a portion of which compensation is obtained by brush displacement, and means whereby said brushes may be adjusted independently of said regulator to provide for the reversing of the angle of brush displacement when the motor is reversed.

4. In combination, an alternating commutator motor provided with adjustable brushes, an induction regulator connected to supply regulating voltages to said brushes, means for simultaneously adjusting said regulator through 360 electrical degrees and said brushes through less than 180 electrical degrees to vary the speed of said motor through a speed range from above to below synchronism while maintaining power factor compensation in either direction of rotation, and means whereby said brushes may be adjusted independently of said regulator to obtain the desired relation between the brushes and regulator when the motor is reversed.

5. In combination, an alternating current commutator motor provided with adjustable brushes, an induction regulator connected to supply speed regulating voltages to said brushes, said regulator being designed to produce two relatively rotatable voltage vectors which are unequal, and means for impressing the difference of said voltages upon the brushes at approximately synchronous speed to provide power factor compensation.

6. In combination, an alternating current commutator motor provided with adjustable brushes, an induction regulator connected to supply regulating voltages to said brushes, common adjusting means for said brushes and regulator, and means responsive to the torque of said regulator for producing an adjustment of said regulator independently of the adjustment of said brushes.

7. An alternating current motor, an induction regulator connected to supply regulating voltages to said motor, means for adjusting said regulator to vary the speed of said motor, and means responsive to the torque of said regulator for altering said first mentioned adjustment to compensate for changes in speed due to changes in load.

8. An alternating current motor, an induction regulator connected to supply regulating voltages to said motor, manual means for adjusting said regulator, and means responsive to the torque of said regulator in one direction only for altering said first mentioned adjustment.

9. In combination, an alternating current commutator motor provided with adjustable brushes, an induction regulator connected to supply regulating voltages to said brushes, common adjusting means for said regulator and brushes for regulating the speed of said motor from above to below synchronism, and means responsive to the load on said regulator when the latter is operating below synchronism for altering the adjustment of said regulator independently of the adjustment of the brushes in a direction tending to increase the speed of the motor.

10. In combination, an alternating current commutator motor provided with adjustable brushes, an induction regulator connected to supply regulating voltages to said brushes, manually controllable means for simultaneously adjusting said brushes and regulator, manually controllable means whereby said brushes may be adjusted independently of said regulator, and automatic means responsive to the load on said motor for adjusting said regulator independently of said brushes.

In witness whereof, I have hereunto set my hand this 7th day of September, 1926.

WILHELM WELSCH.